Jan. 3, 1939.   D. SCIAKY   2,142,619
APPARATUS FOR CHECKING THE QUALITY OF WELDS
Filed June 21, 1934   2 Sheets-Sheet 1
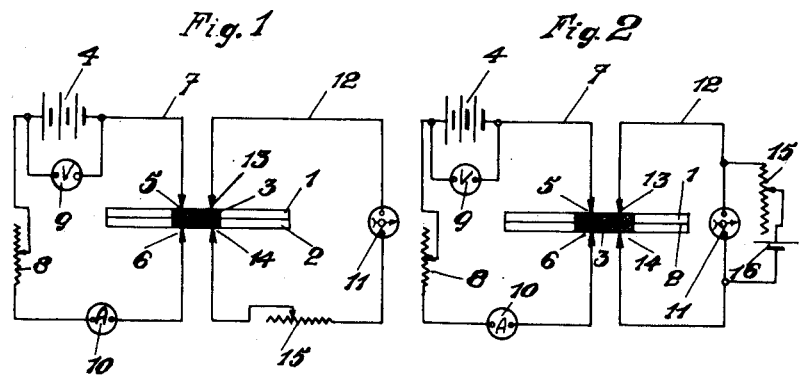
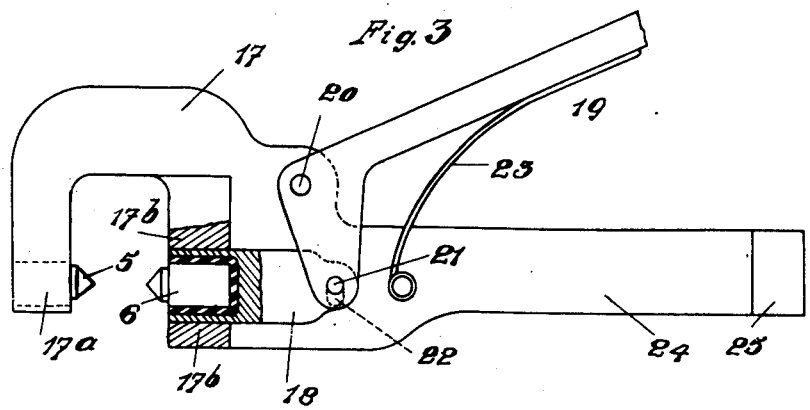
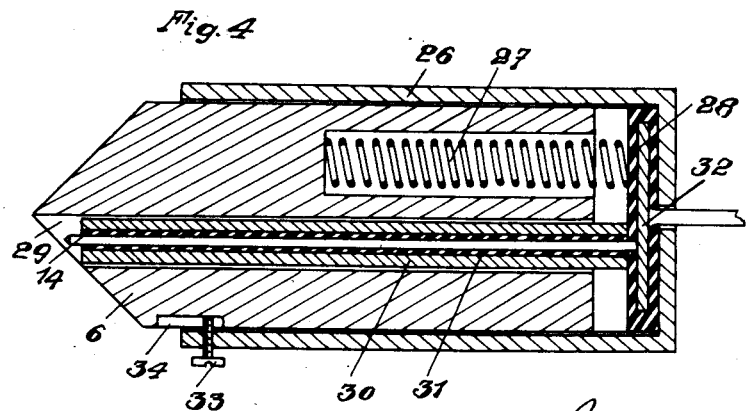
Inventor:
David Sciaky Patented Jan. 3, 1939

2,142,619

UNITED STATES PATENT OFFICE 2,142,619

APPARATUS FOR CHECKING THE QUALITY OF WELDS

David Sciaky, Paris, France

Application June 21, 1934, Serial No. 731,789
In France June 27 1933

5 Claims. (Cl. 175—183)

The present invention relates to methods and apparatus for checking the value of welds, after the welding operation has been performed, and even a long time after this operation. Up to now it was nearly impossible to perform this verification, which is of an essential necessity, and this has been an obstacle to the development of welding for the assembly of pieces. In spot welding, in particular, the operative cannot check the value of the work he has effected, because of the complete automaticity of the machine.

The chief methods known at the present time for checking the value of welds are the following:

(a) By means of the magnetic spectrum: this method consists in placing the weld in a magnetic field and in pouring iron filings upon the welded part by means of a sieve. The shape of the lines of force indicated by the direction of the iron filings gives an empirical and very approximate idea of the value of the weld;

This method has many drawbacks: In particular it is hardly suitable for industrial use. The small dimensions of the welded part do not permit of obtaining a sufficiently large image for estimating with a certain degree of accuracy the value of the weld. The part to be checked must always be in a horizontal position, etc. Anyway, for practical purposes, this method did not give the satisfactory results that were expected therefrom.

(b) By means of ultra-penetrating rays (X-rays, Roentgen rays, etc.). This method consists in placing the welded part to be checked in the flux of a source of such rays and photographing the image. This method has the disadvantage of being expensive and long to carry out, and of necessitating a specialist. Furthermore, this method can be carried out but in a laboratory.

(c) Through purely mechanical methods (tractive, tearing, shearing stresses, etc.). These methods require a considerable equipment and they have the very serious drawback of injuring, or at least fatiguing the weld.

The object of the present invention is to eliminate the drawbacks of the known methods. As a matter of fact, my process is simpler and easier to carry out than the prior methods and it makes it possible to estimate accurately the value of welds. Accordingly, with the process according to the present invention, it is possible to enlarge the field of application of welding and even to employ it in certain branches (aviation, naval engineering, etc.) in which only riveting was utilized up to the present time because it afforded more safety.

My process consists in causing an electric current to flow, transversely, through the pieces assembled by welding and in studying the distribution of the resulting potential upon the assembled pieces. This distribution depends strictly upon the nature of the assembly between the metals so that it permits of checking the value of the weld. The method consists in measuring the difference of potential thus produced between points located on the front and rear surfaces of the assembled parts in the immediate vicinity and at a known distance, which is always the same, from the point at which current is fed, the value of said current being itself known.

It should be noted that in the measuring methods that have been used up to this time (for the measurement of shunts or of the resistance of rail welded joints) the direction of the current is parallel to the length of the part, so that the points where measurements are made are spaced apart along the part. In my method, on the contrary, current is caused to flow transversely to the longitudinal direction of the parts, the tension itself being tapped off outside of the direct line of passage of the current. By the way, it should be noted that, if, in a filiform conductor, the expression "voltage drop" has an understandable meaning, it takes an unexpected meaning when applied to the case of a heterogeneous and flat body, such for instance as a metal sheet. The fact of causing a current to flow between two points located on opposite sides of the sheets respectively produces, in the whole mass, a distribution of potential. At any point of the sheets, a value of the potential can be measured, which depends merely on the intensity of the current flowing between the contacts through which current is fed.

The apparatus according to the present invention permits of measuring, in a very simple manner, the tension between two points located at a suitable distance from the contact points that have been chosen.

Preferred embodiments of the present invention will be hereinafter described, with reference to the accompanying drawings, given merely by way of example, and in which:

Fig. 1 is a diagram of the connections of a device for measuring the value of welds, according to the invention;

Fig. 2 is a diagram of the connections of a modification;

Fig. 3 is an elevational view of an apparatus according to the invention;

Fig. 4 is a detail view of one of the electrodes of this apparatus;

Figure 5:
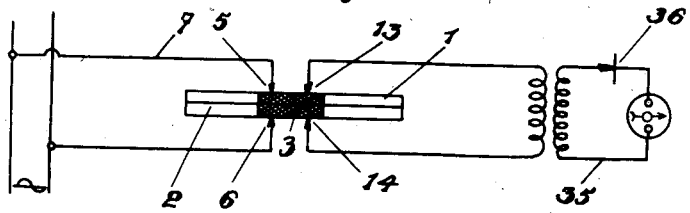
Fig. 5 is a diagram of the connections of a device for carrying out the method in the case of alternating current.

According to the invention, parts 1 and 2, which are assembled together by a weld 3, are traversed, in a transverse direction by electric current fed from a source 4 of any kind whatever, this current being led to said parts through contacts 5 and 6. Circuit 7 includes a rheostat 8, as well as electric measuring apparatus, to wit a voltmeter 9 and an ammeter 10. The current that flows through the parts produces a voltage drop which can be measured by means of a galvanometer 11 the circuit 12 of which is connected to contact members 13 and 14. The value of the current flowing through this galvanometer can be adjusted by means of a variable resistance 15 connected either in series or in shunt with this galvanometer.

The distance between the measuring electrodes 13 and 14 and the main electrodes 5 and 6 through which current is fed is fixed.

If the assembling of the parts that are welded together is defective, the shunting of the current flowing through the sheet in the vicinity of the surface is considerable and the difference of potential that is measured between the auxiliary electrodes 13 and 14 is very high. On the contrary, if the weld is good, the difference of potential between the auxiliary electrodes is very low and nearly the whole of the current flows directly between electrodes 5 and 6.

Instead of making use of the arrangement illustrated by Fig. 1, I may utilize a diagram analogous to that shown by Fig. 2, by means of which it is possible to utilize a zero method. The circuit 7 through which voltage is supplied is not modified, but in the measuring circuit 12 a battery 16, or any other source of electric current, is inserted, either in series or in shunt with galvanometer 11. I thus produce between the parts a potential opposed to the potential supplied by source 4. The whole can be arranged in such manner that the galvanometer needle points to zero when the weld is good.

The apparatus shown by Figs. 3 and 4 permits of easily and rapidly carrying out the method according to the present invention, this apparatus serving to set up simultaneously current through the contacts that supply the voltage and through the measurement contacts. This apparatus consists of tongs 17 carrying two electrodes 5 and 6, one of which is mounted on the stationary part 17ª of said tongs while the other is fitted in a sliding member 18 in which it is suitably insulated. This member 18 is movable in guides 17ᵇ, provided in the tongs, under the action of a lever 19. This lever is pivoted at 20 to the tongs and acts on sliding member 18 through a pin 21 movable in an oval-shaped hole 22 provided in said sliding member. Under normal conditions, the two electrodes are maintained at a distance from each other through the action of a spring 23. In order to balance the apparatus, a weight 25 is provided at the end of handle 24.

In order to establish simultaneously the contacts for applying voltage and the measurement contacts, the electrodes may be arranged as shown by Fig. 4. Electrodes 5 and 6, which serve to apply voltage are mounted in such manner as to be movable in sockets 26. A spring 27 bears on the one hand on the electrode and on the other hand on the bottom 28 of the socket so as to push the electrode away from the bottom. A channel 29 is provided in each electrode. An electrode 13 (or 14) for measurement is fitted in this channel, said electrode being separated from the main electrode by a brass sleeve 30 and an insulating tube 31. Each auxiliary electrode 13, 14 is connected to circuit 12 through a brass disc 32. The displacements of electrodes 5 and 6 are limited by screws 33, or equivalent organs, engaged in a slot 34 provided in the corresponding electrode.

When the tongs are closed on the parts 1 and 2, electrodes 5 and 6 are applied against said parts while being depressed into their housings, which brings the points of electrodes 13, 14 into contact with the respective parts 1 and 2 and closes the circuit of galvanometer 11.

Figure 6:
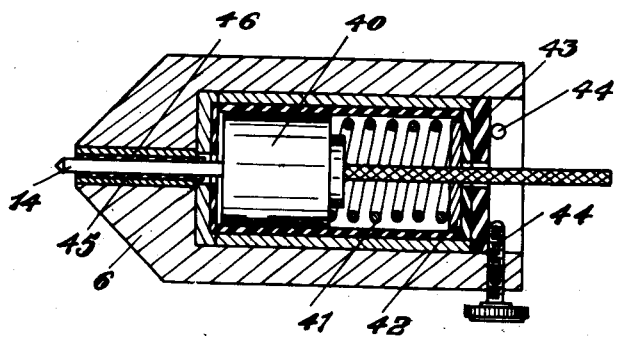
Fig. 6 is a detail view of another type of electrode.

In the modification shown by Fig. 6, needle 14 is disposed coaxially with respect to electrode 6. Said electrode is hollow and in the recess formed therein there is provided a metallic piece 40 movable axially and insulated from the electrode. This piece 40 is subjected to the action of a spring 41 bearing upon a disc 42 suitably insulated and fixed by means of another disc 43 itself secured in position by means of three screws 44. Piece 40 is solid with needle 14, which slides, together with its insulating sleeve 45, in a conduit 46 consisting of a small brass tube rigidly fixed to the electrode.

Attention is called to the manner in which each auxiliary electrode is fixed. Said electrode is adapted to slide individually with respect to the tongs in such manner that a permanent contact with the metal is obtained from the moment when the tongs are applied and until the main electrodes close their circuit by their being pressed upon the weld to be checked (or vice-versa). In other words, with this arrangement, independence between the auxiliary and main contacts is obtained.

I can make use of alternating current for measurement. I have shown in Fig. 5 a diagram of the connections that can be utilized with alternating current. The primary circuit 7 is fed with alternating current and in the secondary circuit 35 I provide a rectifier 36, for instance of the copper oxide type.

According to the nature of the metals that are welded and their thickness, I may make use of a source of current with multiple tappings so as to vary the feed voltage of the main electrodes, and therefore the value of the measuring current, in accordance with the nature and the thickness of the metal parts. I can also control the sensitiveness of the apparatus by means of shunts and resistances connected in series with the measuring apparatus. I can also vary the sensitiveness of the apparatus by means of a magnetic shunt, by variation of the optical lever, etc. Still for the same object, the tongs itself can be so arranged as to control the sensitivity of the measuring apparatus when it is closed on the parts. Finally, the main circuit 7 can also control this sensitivity.

In a general manner, while I have disclosed what I deem to be preferred embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An apparatus for checking the quality of a weld between two sheets of metal, which comprises, in combination, a mechanical device including two branches movable with respect to each other and means for forcing said branches toward each other, a main electrode carried by each of these branches so that these electrodes can be applied against the outer faces of the welded portions of said sheets, respectively, said electrodes being arranged to be connected to a feed circuit, an auxiliary electrode carried by each of these branches, said auxiliary electrodes being arranged to be connected to a measuring circuit, the main electrode and the auxiliary electrode carried by each branch being slidable with respect to each other, stop means for limiting the outward displacement of one of said main electrodes with respect to the other, and elastic means for urging said main electrodes toward relative positions corresponding to the maximum outward displacement in such manner that, in each branch, one electrode, of the same kind for both branches, is normally caused to project with respect to the other electrode.

2. An apparatus according to claim 1 in which the auxiliary electrodes are slidably mounted in the main electrodes, and the elastic means consist of a spring interposed between the main electrode and the corresponding member of the mechanical device, further including means for rigidly connecting each auxiliary electrode to its corresponding member.

3. An apparatus according to claim 1 in which each auxiliary electrode is slidably mounted in the corresponding main electrode, said spring means being arranged to urge said auxiliary electrode to move outwardly with respect to the corresponding main electrode.

4. A device for detecting flaws in plates, comprising a source of electric current, means for passing said current through the plate from one surface thereof to the other surface thereof by means of tubular electrodes engaging said surfaces, and means including potential contacts positioned within said electrodes for measuring variations in the potential drop between said surfaces.

5. A device for detecting flaws in plates, comprising a source of electric current, means for passing said current through the plate from one surface thereof to the other surface by means of tubular electrodes engaging said surfaces, and means including potential contacts positioned with their axes in substantial coincidence with the axes of said electrodes for measuring variations in the potential drop between said surfaces.

DAVID SCIAKY.